United States Patent
Kim et al.

(10) Patent No.: US 10,554,900 B2
(45) Date of Patent: Feb. 4, 2020

(54) DISPLAY APPARATUS AND METHOD OF PROCESSING IMAGE THEREOF

(71) Applicant: SAMSUNG ELECTRONICS CO., LTD., Suwon-si, Gyeonggi-do (KR)

(72) Inventors: Dong-yoon Kim, Suwon-si (KR); Seung-ho Park, Seoul (KR); Seong-hoon Choi, Yongin-si (KR); Ho-cheon Wey, Seongnam-si (KR); Young-su Moon, Seoul (KR); Tae-gyoung Ahn, Yongin-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 284 days.

(21) Appl. No.: 15/651,138

(22) Filed: Jul. 17, 2017

(65) Prior Publication Data
US 2018/0084180 A1    Mar. 22, 2018

(30) Foreign Application Priority Data

Sep. 19, 2016   (KR) .................. 10-2016-0119138

(51) Int. Cl.
*H04N 5/235*  (2006.01)
*G06T 5/00*   (2006.01)
(Continued)

(52) U.S. Cl.
CPC .......... *H04N 5/2355* (2013.01); *G06T 5/007* (2013.01); *H04N 5/351* (2013.01); *G06T 2207/10004* (2013.01); *G06T 2207/20012* (2013.01); *G06T 2207/20221* (2013.01); *H04N 5/235* (2013.01); *H04N 9/3188* (2013.01)

(58) Field of Classification Search
None
See application file for complete search history.

(56) References Cited

U.S. PATENT DOCUMENTS

| 8,675,984 B2 | 3/2014  | Jia et al. |
|---|---|---|
| 9,489,725 B2 | 11/2016 | Kwon |

(Continued)

FOREIGN PATENT DOCUMENTS

| KR | 10-2011-0088050 | 8/2011 |
|---|---|---|
| KR | 10-2016-0053632 | 5/2016 |
| KR | 10-2016-0055629 | 5/2016 |

OTHER PUBLICATIONS

Duan, Jiang, et al. "Tone-mapping high dynamic range images by novel histogram adjustment." Pattern Recognition 43.5 (May 1, 2010): 1847-1862. (Year: 2010).*

*Primary Examiner* — Kim Y Vu
*Assistant Examiner* — Nathan J Bloom
(74) *Attorney, Agent, or Firm* — Nixon & Vanderhye P.C.

(57) ABSTRACT

A display apparatus and a method of processing an image thereof are provided. The method includes identifying at least one area of an input image by analyzing a dynamic range of the input image, obtaining at least one mapping function based on dynamic range information and brightness information of the at least one area and dynamic range information of the display apparatus, obtaining at least one virtual image where the dynamic range of the input image is converted using the at least one mapping function, synthesizing the at least one virtual image and the input image, and outputting the synthesized image.

14 Claims, 12 Drawing Sheets

(51) Int. Cl.
*H04N 5/351* (2011.01)
*H04N 9/31* (2006.01)

(56) References Cited

U.S. PATENT DOCUMENTS

| | | | |
|---|---|---|---|
| 2007/0183680 A1* | 8/2007 | Aguilar | G06K 9/00248 |
| | | | 382/254 |
| 2008/0101719 A1* | 5/2008 | Lim | H04N 1/4072 |
| | | | 382/274 |
| 2008/0273110 A1* | 11/2008 | Joza | H04N 5/235 |
| | | | 348/333.05 |
| 2014/0079334 A1* | 3/2014 | Verrall | H04N 5/23216 |
| | | | 382/274 |
| 2015/0213586 A1* | 7/2015 | Koike | G06T 5/007 |
| | | | 382/284 |
| 2015/0373247 A1 | 12/2015 | Boitard et al. | |
| 2016/0127665 A1 | 5/2016 | Cho | |
| 2016/0232419 A1* | 8/2016 | Bai | G06T 5/007 |
| 2017/0032506 A1* | 2/2017 | Asaka | G06T 5/008 |
| 2017/0161882 A1* | 6/2017 | Mantiuk | G06T 5/007 |
| 2017/0256039 A1* | 9/2017 | Hsu | G06T 5/009 |

* cited by examiner

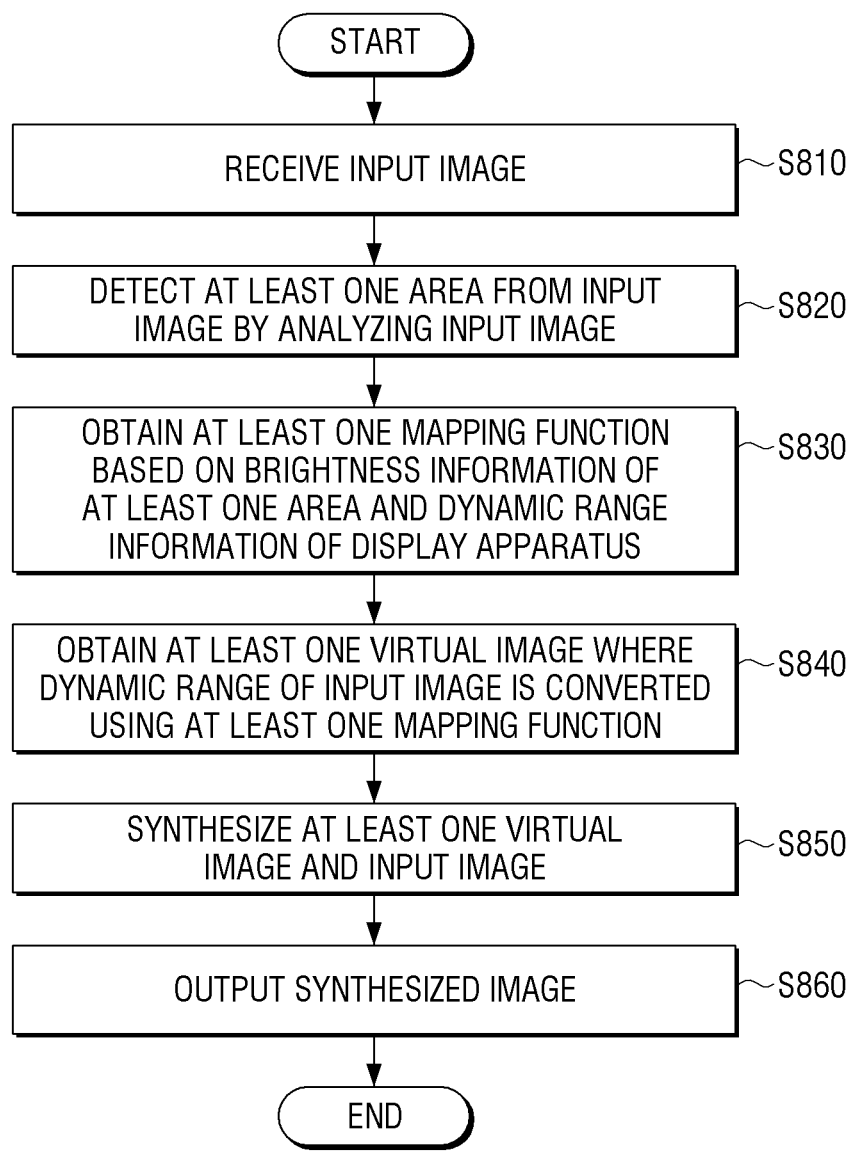

DISPLAY APPARATUS AND METHOD OF PROCESSING IMAGE THEREOF

CROSS-REFERENCE TO RELATED APPLICATION

This application is based on and claims priority under 35 U.S.C. § 119 to Korean Patent Application No. 10-2016-0119138, filed on Sep. 19, 2016, in the Korean Intellectual Property Office, the disclosure of which is incorporated by reference herein in its entirety.

BACKGROUND

Field

The present disclosure relates generally to a display apparatus and a method of processing an image thereof, and for example, to a display apparatus for changing a dynamic range of an input image using a mapping function and a method of processing an image thereof.

Description of Related Art

A dynamic range of a display apparatus refers to a ratio of the brightest grayscale to the darkest grayscale that may be represented by a display. As a recent display apparatus has a wide dynamic range and represents brightness of a high light intensity, a representation of a high dynamic range (HDR) image becomes possible.

However, existing images are produced as 8-bit low dynamic range (LDR) images. If such an LDR image is represented on an HDR display without image-quality processing, an unnatural image is obtained. Therefore, there is a need for an inverse tone mapping technique that is a technique of changing a dynamic range so as to enable an LDR image to be appropriately displayed on an HDR display.

In order to represent a scene having a wide dynamic range on an LDR display having a narrow dynamic range of 200 nit, a dynamic range is to be compressed when obtaining an LDR image. If an LDR image is obtained from a camera, an eyesight of a human is sensitive to a low grayscale change according to Weber's law. Therefore, a compression amount of a high grayscale is relatively larger than a compression amount of a low grayscale. As a result, a loss of a detail of a high grayscale occurs in an LDR image. In particular, as a scene has a wider dynamic range, a detail loss of a high grayscale caused by compression increases.

Also, an LDR image is obtained to be naturally displayed according to brightness of an LDR display of 200 nit. Therefore, when reproducing the LDR image on an HDR display, brightness of medium and low grayscales may be maintained at brightness displayed on the LDR display. If not, a dark scene is brightly displayed, i.e., is unnaturally represented.

Therefore, there is a need for a method of restoring a detail of an input image by maintaining brightness of medium and low grayscales and extending a dynamic range of a high grayscale relatively highly compressed in comparison with the medium and low grayscales when reproducing an LDR image on an HDR display.

SUMMARY

Example embodiments of the present disclosure address the above disadvantages and other disadvantages not described above.

The present disclosure provides a display apparatus for adaptively controlling a dynamic range of an input image by obtaining different mapping functions based on a dynamic range of an input image and dynamic range information of the display apparatus and controlling the dynamic range of the input image using the obtained mapping functions, and a method of processing an image thereof.

According to an example aspect of the present disclosure, a method of processing an image of a display apparatus, includes identifying at least one area by analyzing a dynamic range of an input image, obtaining at least one mapping function based on dynamic range information and brightness information of the at least one area and dynamic range information of the display apparatus, obtaining or obtaining at least one virtual image where the dynamic range of the input image is converted using the at least one mapping function, synthesizing the at least one virtual image and the input image, and outputting the synthesized image.

The identifying may include identifying at least one high grayscale area having brightness higher than or equal to a value identified by analyzing the dynamic range of the input image.

The identifying may include identifying context information indicating an object displayed in the at least one high grayscale area to analyze the dynamic range of the input image.

The at least one mapping function may correspond to at least one high grayscale area. The at least one mapping function may each have different gradients based on a point having an X coordinate value identified based on context information and brightness information of a corresponding high grayscale area and a Y coordinate value identified based on brightness information of a corresponding high grayscale area and dynamic range information of the display apparatus.

The obtaining of the virtual image may include obtaining at least one virtual image where the dynamic range of the input image is converted using different color domains based on the context information.

The identifying may further include identifying at least one low grayscale area having brightness lower than a value identified by analyzing the dynamic range of the input image. The at least one mapping function corresponding to the at least one high grayscale area may be an under curve type, and the at least one mapping function corresponding to the at least one low grayscale area may be an over curve type.

The synthesizing may include synthesizing the at least one virtual image and the input image by applying high weight to a high grayscale pixel of a first virtual image obtained using a mapping function corresponding to a high grayscale area and applying high weight to a low grayscale pixel of a second virtual image obtained using a mapping function corresponding to a low grayscale area.

The identifying may include identifying the at least one area by analyzing at least one selected from context information, a histogram, a cumulative distribution function, a color channel correlation, and a noise characteristic of the input image.

According to another example aspect of the present disclosure, a display apparatus includes an image input unit comprising image input circuitry configured to receive an input of an image, an image processor configured to identify at least one area by analyzing a dynamic range of the input image, to obtain at least one mapping function based on dynamic range information and brightness information of the at least one area and dynamic range information of the display apparatus, to obtain at least one virtual image where the dynamic range of the input image is converted using the at least one mapping function, and to synthesize the at least one virtual image and the input image, and an image output unit comprising image output circuitry configured to output the synthesized image.

The image processor may identify at least one high grayscale area having brightness higher than or equal to a value identified by analyzing the dynamic range of the input image.

The image processor may identify context information indicating an object displayed in the at least one high grayscale area.

The at least mapping function may correspond to at least one high grayscale area. The at least one mapping function may each have different gradients based on a point having an X coordinate value identified based on context information and brightness information of a corresponding high grayscale area and a Y coordinate value identified based on brightness information of a corresponding high grayscale area and dynamic range information of the display apparatus.

The image processor may obtain at least one virtual image where the dynamic range of the input image is converted using different color domains according to the context information.

The image processor may further identify at least one low grayscale area having brightness lower than a value identified by analyzing the dynamic range of the input image. At least one mapping function corresponding to the at least one high grayscale area may be an under curve type, and the at least one mapping function corresponding to the at least one low grayscale area may be an over curve type.

The image processor may synthesize the at least one virtual image and the input image by applying high weight to a high grayscale pixel of a first virtual image obtained using a mapping function corresponding to a high grayscale area and applying high weight to a low grayscale pixel of a second virtual image obtained using a mapping function corresponding to a low grayscale area.

The image processor may identify the at least one area by analyzing at least one selected from context information, a histogram, a cumulative distribution function, a color channel correlation, and a noise characteristic of the input image.

According to various example embodiments of the present disclosure, when a low dynamic range (LDR) image is output by a high dynamic range (HDR) display, a detail restoring force of a high grayscale area of the LDR image may be improved. Also, brightness of an input image may be maintained with respect to medium and low grayscale areas so as to minimize distortion by using brightness of the LDR image and maximum brightness of a display.

In addition, a color distortion of the input image may be prevented and/or reduced by using different color domains based on a context of the input image.

Additional and/or other aspects and advantages of the disclosure will be set forth in part in the description which follows and, in part, will be apparent from the description.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein:

FIG. 8 is a flowchart illustrating an example method of processing an image of a display apparatus according to an example embodiment of the present disclosure.

DETAILED DESCRIPTION

Figure 1:
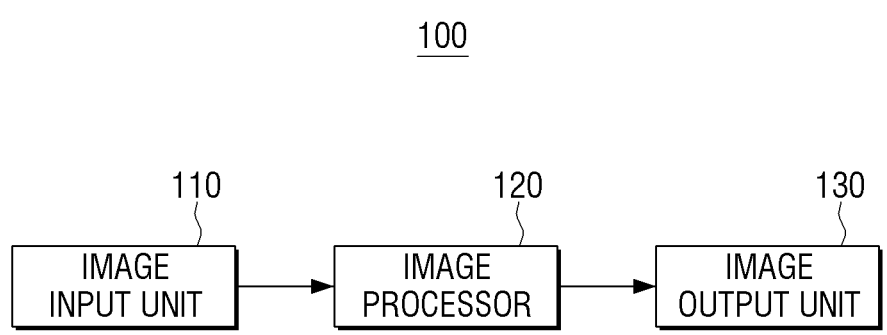
FIG. 1 is a block diagram illustrating an example configuration of a display apparatus according to an example embodiment of the present disclosure.

Various example embodiments of the present disclosure will now be described in greater detail with reference to the accompanying drawings.

In the following description, same drawing reference numerals are used for the same elements even in different drawings. The matters defined in the description, such as detailed construction and elements, are provided to assist in a comprehensive understanding of the disclosure. Thus, it is apparent that the example embodiments of the present disclosure can be carried out without those specifically defined matters. Also, well-known functions or constructions may not described in detail if they would obscure the disclosure with unnecessary detail.

The terms herein will be described in brief, and the present disclosure will be described in detail The terms used in example embodiments of the present disclosure are selected as general terms that are currently widely used in consideration of their functions in the present disclosure. However, this may depend on intentions of those skilled in the art, precedents, emergences of new technologies, or the like.

In the example embodiments of the present disclosure, a "module" or a "part" performs at least one function or operation, and may be implemented with hardware, software, or a combination of hardware and software. In addition, a plurality of "modules" or a plurality of "parts" may be integrated into at least one module, except for a "module" or a "part" which has to be implemented as particular hardware so as to be implemented as at least one processor (not shown).

Also, the expressions "have", "may have", "include", "may include", etc. that may be used in various example embodiments of the present disclosure designate the presence of features, numbers, steps, operations, components, elements, or a combination thereof that are disclosed in the specification, but do not exclude the presence or possibility of addition of one or more other features, numbers, steps, operations, components, elements, or a combination thereof.

As used herein, the term "and/or" includes any and all combinations of one or more of the associated listed items. For example, the expressions "A or B" may include "A," "B," or "A and B."

Although the expressions 'first', 'second', etc. may be used herein to describe various elements regardless of order and/or importance, these elements may not be limited by these terms. These terms are only used to distinguish one element from another. For example, a first element may be termed a second element, and, similarly, a second element may be termed a first element, without departing from the scope of example embodiments. For example, both of a first user device and a second user device are user devices and indicate different user devices. For example, a first element may be termed a second element, and, similarly, a second element may be termed a first element, without departing from the scope of example embodiments.

It will be understood that when an element is referred to as being "coupled with/to" or "connected to" another, the element may be connected to the another element directly or through another element. On the other hand, when an element is referred to as being "directly coupled with/to" or "directly connected to" another element, there are no intervening elements between the element and the another element.

The terminology used herein is for the purpose of describing particular embodiments merely and is not intended to be limiting of example embodiments. As used herein, the singular forms are intended to include the plural forms as well, unless the context clearly indicates otherwise.

Unless otherwise defined, all terms (including technical and scientific terms) used herein have the same meaning as commonly understood by one of ordinary skill in the art to which example embodiments belong. It will be further understood that terms, such as those defined in commonly used dictionaries, may be interpreted as having a meaning that is consistent with their meaning in the context of the relevant art and will not be interpreted in an idealized or overly formal sense unless expressly so defined herein.

Hereinafter, an electronic device according to various example embodiments of the present disclosure will be described with reference to the attached drawings. FIG. 1 is a block diagram illustrating an example configuration of a display apparatus 100 according to an example embodiment of the present disclosure. As illustrated in FIG. 1, the display apparatus 100 includes an image input unit (e.g., including image input circuitry) 110, an image processor (e.g., including processing circuitry) 120, and an image output unit (e.g., including image output circuitry) 130. Here, the display apparatus 100 may be a digital television (TV), but this is merely an example embodiment and the display apparatus is not limited thereto. Therefore, the display apparatus 100 may be realized as various types of display apparatuses such as a monitor, a notebook personal computer (PC), a desktop PC, a tablet PC, a kiosk PC, or the like without limitation. Also, the technical spirit of the present disclosure may be applied to an electronic device capable of processing an image like a set-top box, a game machine, or the like, without limitation, not including a display.

The image input unit 110 may include various image input circuitry that receives an image from an external source. Here, the received image may be an 8-bit low dynamic range (LDR) image.

The image input unit 110 may include various image input circuitry, such as, for example, and without limitation, a tuner for receiving a broadcast content, a terminal (e.g., a High Definition Multimedia Interface (HDMI) terminal or the like) for receiving an image content from an external device, a communication module for receiving an image content from an external server, or the like, but this is merely an example embodiment, and the image input circuitry is not limited thereto. Therefore, the image input unit 110 may be realized as another element for receiving an image.

The image processor 120 may include various processing circuitry that processes an image input from the image input unit 110 and outputs the processed image to the image output unit 130. In particular, the image processor 120 may identify at least one area from the input image by analyzing a dynamic range of the input image. Also, the image processor 120 may obtain at least one mapping function based on context information and brightness information of the at least one area and dynamic range information of the display apparatus 100. In addition, the image processor 120 may obtain (generate) at least one virtual image where the dynamic range of the input image is converted using the at least one mapping function and synthesize the at least one virtual image and the input image.

In detail, the image processor 120 may identify at least one high grayscale area having brightness higher than or equal to a value identified by analyzing the dynamic range of the input image. For example, the image processor 120 may identify a sky area, a snow area, or the like, which has brightness higher than or equal to a value identified by analyzing the dynamic range of the input image, as the high grayscale area.

Also, the image processor 120 may identify context information indicating an object displayed in the at least one high grayscale area. In other words, the image processor 120 may acquire the context information by analyzing an object included in the identified high grayscale area. In addition, the image processor 120 may acquire the context information by using various types of information including metadata and the like.

Moreover, the image processor 120 may obtain a mapping function corresponding to the identified high grayscale area. Here, the mapping function may be a function for converting the dynamic range of the input image so as to enable the dynamic range of the input image to be mapped on a dynamic range of a display included in the display apparatus 100. In particular, the image processor 120 may obtain a mapping function having different gradients based on a point having an X coordinate value that is identified based on context information, brightness information, and the like of a corresponding high grayscale area and an Y coordinate value that is identified based on brightness information of the corresponding high grayscale area and the dynamic range information of the display apparatus 100.

Here, the X coordinate value is a value for distinguishing a high grayscale and a low grayscale, and gradients of a low grayscale area and a high grayscale area of a mapping function may be calculated (determined) so as to maximally maintain original brightness of the low grayscale area and maximally extend brightness of the high grayscale area according to a characteristic of the display apparatus 100 based on coordinate values. For example, the mapping function may have a straight line having a small gradient so as to maximally maintain the original brightness in the low grayscale area but may have a straight line having a large gradient so as to maximally extend brightness in the high grayscale area.

Also, the X coordinate value may be identified as a high grayscale distinguishing point through a method such as clustering, Otsu thresholding, or the like. In addition, an X coordinate value that is identified based on context information for estimating a dynamic range may be changed. For example, if the context information is sky, the context information is a scene having a wide dynamic range, and thus an X coordinate value may increase to increase a gradient of a mapping function so as to maximally and/or increasingly extend brightness of a high grayscale area. The context information extracted from the input image may include object information such as sky, snow, illumination, or the like, information such as a color chroma histogram, an edge strength histogram, or the like, and the like.

According to an example embodiment of the present disclosure, the image processor 120 may further identify at least one low grayscale area having brightness lower than a value identified by analyzing a dynamic range.

Also, the image processor 120 may further obtain a mapping function corresponding to the low grayscale area. Here, at least one mapping function corresponding to at least one high grayscale area may be a under curve type, and at least one mapping function corresponding to at least one low grayscale area may be over curve type.

In addition, the image processor 120 may obtain at least one virtual image using the input image and a mapping function. Here, the virtual image is an image of which a dynamic range is extended by applying a mapping function to the input image and may be obtained by the number corresponding to the number of extracted images.

Also, the image processor 120 may obtain a final image having an extended dynamic range by synthesizing at least one virtual image and an original image. The image processor 120 may synthesize the at least one virtual image and the original image by applying high weight to a high grayscale pixel of a first virtual image obtained using a mapping function corresponding to a high grayscale area and applying high weight to a low grayscale pixel of a second virtual image obtained by using a mapping function corresponding to a low grayscale area. Here, the image processor 120 may synthesize images through a weighted addition of an original image and virtual images by using weights applied to the virtual images. However, this is merely example embodiment, and thus images may be synthesized through various operation methods with respect to each pixel value of the original image and each pixel value of a virtual image.

Also, the image processor 120 may output the synthesized image to the image output unit 130.

The image processor 120 may include, without limitation, at least one processor. For example, the image processor 120 may include various processing circuitry, such as, for example, and without limitation at least of a dedicated processor, a central processing unit (CPU), a graphic processing unit (GPU), and an application unit (AP).

According to an example embodiment of the present disclosure, the image processor 120 may obtain at least one virtual image where the dynamic range of the input image is converted using different color domains according to context information to maintain a chroma of an image. This will be described in greater detail below.

The image output unit 130 may include various output circuitry that outputs the final image obtained by the image processor 120. Here, the image output unit 130 may, for example, and without limitation, be a display, but this is merely an example embodiment and the output circuitry is not limited thereto. Therefore, the image output unit 130 may be realized as an image output terminal for outputting an image to an external apparatus or the like.

Figure 2:
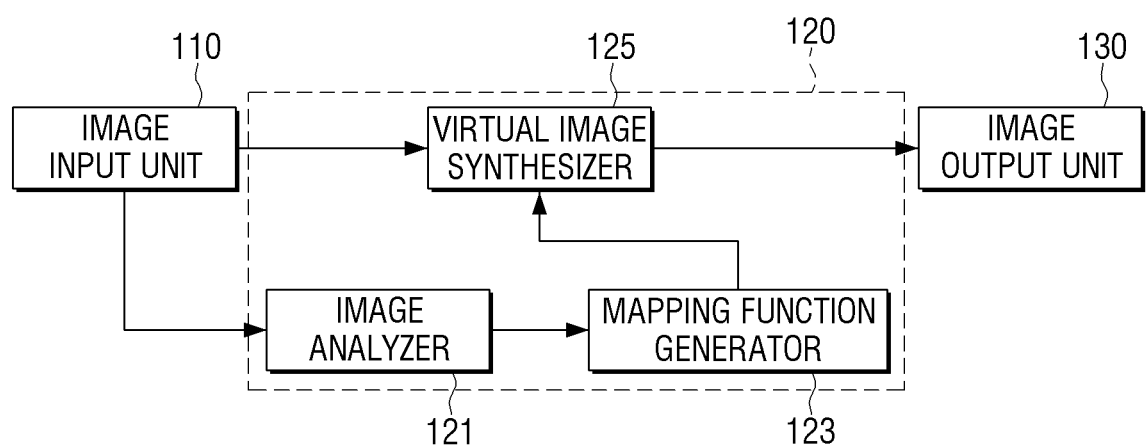
FIG. 2 is a block diagram illustrating an example configuration of an image processor according to an example embodiment of the present disclosure.

Hereinafter, the present disclosure will be described in greater detail with reference to FIGS. 2, 3A, 3B, 4A, 4B, 5, 6A, 6B, 7A and 7B. FIG. 2 is a block diagram illustrating an example configuration of the image processor 120, according to an example embodiment of the present disclosure. The image processor (e.g., including processing circuitry) 120 includes an image analyzer (e.g., including processing circuitry and/or program elements) 121, a mapping function generator (e.g., including processing circuitry and/or program elements) 123, and a virtual image synthesizer (e.g., including processing circuitry and/or program elements) 125.

Figure 3A:
FIGS. 3A and 3B are diagrams illustrating example detection of a plurality of areas from an input image according to an example embodiment of the present disclosure.
Figure 3B:
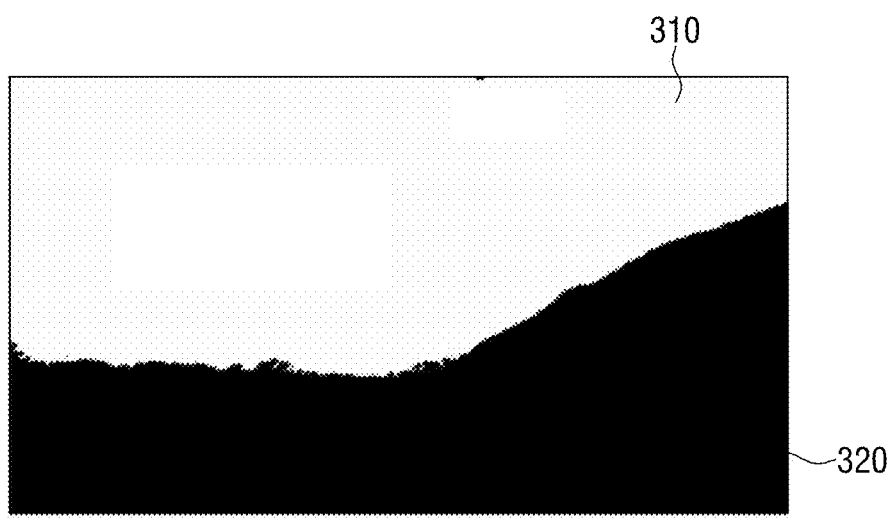

The image analyzer 121 may include various processing circuitry and/or program elements that analyzes an image input through the image input unit 110. In particular, the image analyzer 121 may identify at least one high grayscale area or at least one low grayscale area by analyzing a dynamic range of the input image. Here, the image analyzer 121 may identify at least one area from the input image by analyzing an object of the input image. According to an example embodiment of the present disclosure, if a sky exists in an input image as illustrated in FIG. 3A, the image analyzer 121 may identify an area 310 where the sky exists, as a high grayscale area as illustrated in FIG. 3B. Here, the image analyzer 121 may identify a grassland area 320, which is an area other than the sky, as a low grayscale area.

The area 310 where the sky exists is identified as the high grayscale area in the above-described example embodiment, but this is merely an example embodiment. Therefore, an area where snow exits, an area where a white color wall exists, an area where light exists, or the like, without limitation, may be identified as a high grayscale area.

Also, the image analyzer 121 may acquire context information using, for example, an object characteristic.

The image analyzer 121 may identify at least one high grayscale area or at least one low grayscale area by analyzing at least one selected from a histogram, a cumulative distribution function, a color channel correlation, and a noise characteristic of the input image.

The mapping function generator 123 may include various processing circuitry and/or program elements that obtain a mapping function corresponding to the high grayscale area identified by the image analyzer 121. Here, the mapping function generator 123 may obtain a plurality of mapping functions corresponding to the number of high grayscale areas.

Figure 4A:
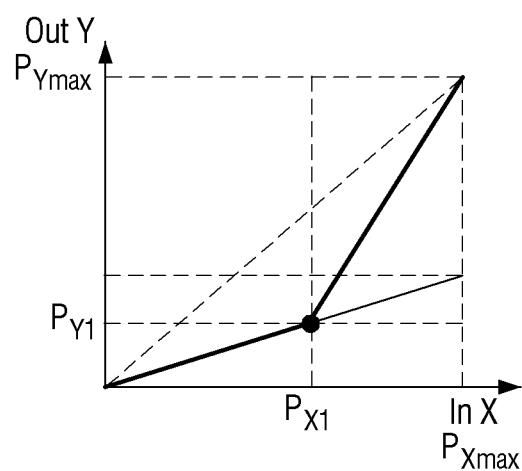
FIGS. 4A, 4B, 5, 6A and 6B are diagrams illustrating an example mapping function according to various example embodiments of the present disclosure.
Figure 4B:
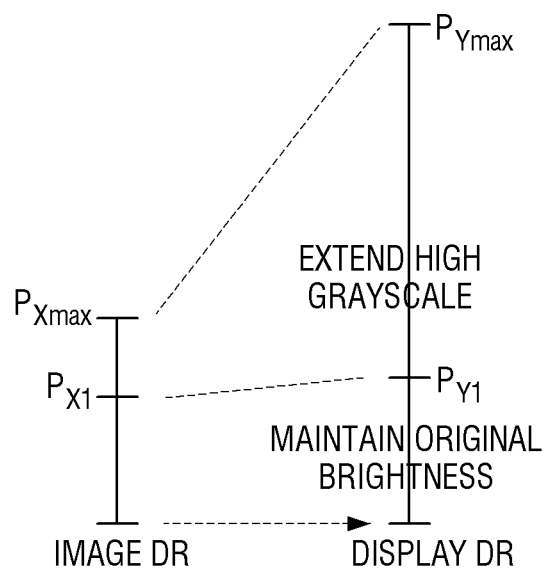

The mapping function generator 123 may obtain an under curve type mapping function as the mapping function corresponding to the high grayscale area as illustrated in FIG. 4A. In other words, an under curve type mapping function may be a mapping function having a small gradient so as to maximally maintain original brightness for a low grayscale area $0 \sim P_{X1}$ and having a large gradient so as to extend a dynamic range for a high grayscale area $P_{X1} \sim P_{Xmax}$ based on a particular point as illustrated in FIG. 4B.

Here, the particular point of which the gradient varies may have an X coordinate value that is identified based on context information, brightness information, and the like of a corresponding high grayscale area and a Y coordinate value that is identified based on brightness information of the corresponding high grayscale area and dynamic range information of the display apparatus 100.

In detail, the mapping function generator 123 may identify the X coordinate value of the particular point of which the gradient varies, as a value corresponding to context information. For example, the mapping function generator 123 may identify different X coordinate values according to whether context information of a high grayscale area is a snow area or a sky area.

Also, the mapping function generator 123 may identify the Y coordinate value of the particular point of which the gradient varies by using a method as in Equation 1 below.

$$P_{y1} = 255 * \frac{\text{Image}_{peak}}{\text{Display}_{peak}} * P_{x1} \quad (1)$$

In other words, the mapping function generator 123 may identify the Y value of the particular point of which the gradient varies at a ratio between maximum brightness of the input image and maximum brightness of a display.

The mapping function generator 123 may obtain merely a mapping function corresponding to a high grayscale area, but this is merely an example embodiment. Therefore, the mapping function generator 123 may obtain an over curve type mapping function corresponding to medium and low grayscale areas as illustrated in FIG. 5.

Here, the over curve type mapping function may be a mapping function having a large gradient to restore details of medium and low grayscales in a low grayscale area $0\sim P_{X2}$ and a small gradient to maintain an original of a high grayscale area $P_{X2}\sim P_{Xmax}$ based on a particular point.

In particular, in an over curve type mapping function, a particular point of which a gradient varies may be obtained by using an under curve type mapping function. For example, the mapping function generator 123 may identify a value such as an X coordinate value $P_{X1}$ of an under curve type mapping function as an X coordinate value $P_{X2}$ of a particular point of which a gradient varies. Also, as illustrated in FIG. 5, the mapping function generator 123 may identify a dot, which is symmetrical to Y coordinate value $P_{Y1}$ of the under curve type mapping function based on a linear line connecting coordinate (0,0) and coordinate $(P_{Xmax}, P_{Ymax})$, as Y coordinate value $P_{Y2}$.

Figure 5:
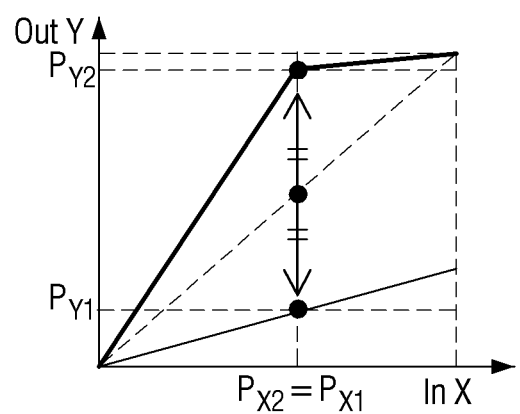
Figure 6A:
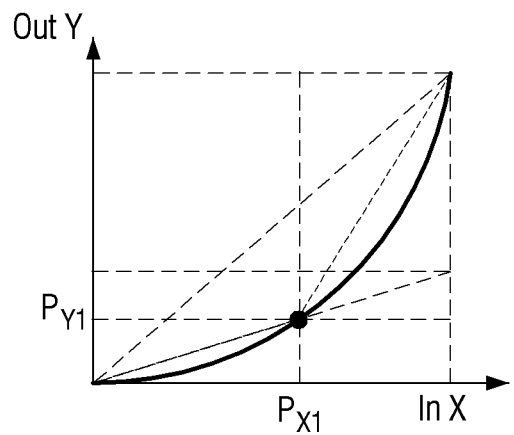
Figure 6B:
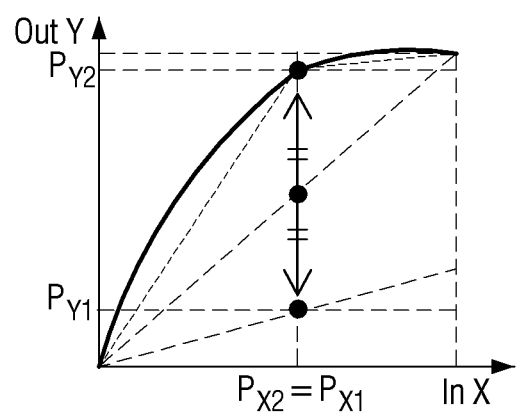

The mapping function generator 123 may process the under curve type mapping function illustrated in FIG. 4A or the over curve type mapping function illustrated in FIG. 5 as a curve type mapping function as illustrated in FIGS. 6A and 6B through a smoothing process.

The virtual image synthesizer 125 may obtain at least one virtual image using at least one mapping function obtained by the mapping function generator 123. In other words, the virtual image synthesizer 125 may obtain at least one virtual image of which dynamic range is changed by applying at least one mapping function to the input image.

Figure 7A:
FIGS. 7A and 7B are diagrams illustrating an example image having context information as described above, according to an example embodiment of the present disclosure.
Figure 7B:

Here, the virtual image synthesizer 125 may obtain a virtual image where the dynamic range of the input image is converted using different color domains based on context information. In detail, if a sky is included in a high grayscale area as illustrated in FIG. 7A, a chroma or a color is not greatly distorted even if a dynamic range is changed. However, if the high grayscale area includes snow (or a white color fabric, white color paper, or the like) not the sky as illustrated in FIG. 7B, a chroma or a color may be distorted by the change in the dynamic range when the chroma is improved.

Therefore, in order to minimize and/or reduce a color distortion, if context information of a high grayscale area includes a particular object (e.g., snow, paper, fabric, or the like), the virtual image synthesizer 125 may obtain a virtual image by changing a dynamic range in a Ycbcr color domain or a Lab color domain not in an RGB color domain. In other words, the virtual image synthesizer 125 may improve merely a detail expression and minimize and/or reduce a color distortion by applying the present disclosure to Y channel in the Ycbcr color domain or L channel in the Lab color domain.

The virtual image synthesizer 125 may obtain a final image by synthesizing at least one virtual image and an input image. Here, the virtual image synthesizer 125 may synthesizer 125 may synthesize images by applying different weights to at least one virtual area. In other words, the virtual image synthesizer 125 may synthesize a first virtual image and a second virtual image by applying high weight (e.g., a weight greater than a predetermined threshold) to a grayscale pixel of the first virtual image using a mapping function corresponding to a high grayscale area and applying high weight to a low grayscale pixel of the second virtual image using a mapping function corresponding to a low grayscale area. For example, the virtual image synthesizer 125 may apply high weight to an area (e.g., a sky area) where a high grayscale pixel exists in a first virtual image obtained by using a mapping function corresponding to the sky area 310 of FIG. 3B and applying high weight to an area (e.g., a grass area) where a low grayscale pixel exists in a second virtual image obtained by using a mapping function corresponding to the grassland area 320.

As described above, the virtual image synthesizer 125 may acquire a final image of which a detail and a color are most improved according to grayscales, by synthesizing virtual images by respectively applying different weights to virtual images.

The virtual image synthesizer 125 may acquire weight using various types of information including detail information, brightness information, color situation information, contrast information, contrast reverse information, color hue information, and the like, but is not limited thereto.

Also, the virtual image synthesizer 125 may obtain a final image by synthesizing at least one virtual image and an input image, but this is merely an example embodiment. Therefore, if a plurality of virtual images are obtained, the virtual image synthesizer 125 may obtain a final image by applying different weights to the plurality of virtual images and synthesizing the plurality of virtual images to which the different weights are applied.

Also, the virtual image synthesizer 125 may output the final image to the image output unit 130.

Hereinafter, a method of processing an image of the display apparatus 100 according to an example embodiment of the present disclosure will be described with reference to FIG. 8.

In operation S810, the display apparatus 100 receives an input of an image. Here, the input image may be an LDR image.

In operation S820, the display apparatus 100 identifies at least one area from the input image by analyzing the input image. Here, the display apparatus 100 may identify a high grayscale area by analyzing a dynamic range and the like of the input image, but this is merely an example embodiment. Therefore, the display apparatus 100 may also identify a low grayscale area.

In operation S830, the display apparatus 100 obtains at least one mapping function based on brightness information of at least one area and dynamic range information of the display apparatus 100. Here, the display apparatus 100 may obtain an under curve type mapping function with respect to the high grayscale area and an over curve type mapping function with respect to the low grayscale area.

In operation S840, the display apparatus 100 obtains at least one virtual image where the dynamic range of the input image is converted using the at least one mapping function. Here, the display apparatus 100 may obtain the at least one virtual image by using different color domains according to context information of the identified area.

In operation S850, the display apparatus 100 synthesizes the at least one virtual image and the input image. Here, the display apparatus 100 may synthesize the at least one virtual image and the input image by respectively applying different weights to the at least one virtual image and the input image.

In operation S860, the display apparatus 100 outputs the synthesized image.

According to a method of processing an image as described above, when an LDR image is output by an HDR display, a detail restoring force of a high grayscale area of the LDR image may be improved.

A method of processing an image according to the above-described various example embodiments may be embodied as a program and then provided for a display apparatus or an input device. In particular, a program including a method of controlling the display apparatus may be stored on a non-transitory computer readable medium and then provided.

The non-transitory computer readable medium is a medium that is readable by devices. For example, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing various example embodiments and advantages are merely examples and are not to be construed as limiting the present disclosure. The present teaching can be readily applied to other types of apparatuses. Also, the description of the example embodiments of the present disclosure is intended to be illustrative, and not to limit the scope of the claims, and many alternatives, modifications, and variations will be apparent to those skilled in the art.

What is claimed is:

1. A method of processing an image of a display apparatus, the method comprising:
   identifying at least one area of an input image by analyzing a dynamic range of the input image;
   obtaining at least one mapping function based on dynamic range information and brightness information of the at least one area and dynamic range information of the display apparatus;
   obtaining at least one virtual image where the dynamic range of the input image is converted using the at least one mapping function;
   synthesizing the at least one virtual image and the input image; and
   outputting the synthesized image,
   wherein the identifying comprises identifying at least one high grayscale area having brightness higher than or equal to a value identified by analyzing the dynamic range of the input image.

2. The method of claim 1, wherein the identifying comprises identifying context information indicating an object displayed in the at least one high grayscale area of the input image to analyze the dynamic range of the input image.

3. The method of claim 2, wherein the at least one mapping function corresponds to at least one high grayscale area,
   wherein the at least one mapping function has different gradients based on a point having an X coordinate value identified based on context information and brightness information of a corresponding high grayscale area and a Y coordinate value identified based on brightness information of a corresponding high grayscale area and dynamic range information of the display apparatus.

4. The method of claim 2, wherein the obtaining of the virtual image comprises obtaining at least one virtual image where the dynamic range of the input image is converted using different color domains based on the context information.

5. The method of claim 3, wherein the identifying further comprises identifying at least one low grayscale area having brightness lower than a value identified by analyzing the dynamic range of the input image,
   wherein the at least one mapping function corresponding to the at least one high grayscale area comprises an under curve type, and the at least one mapping function corresponding to the at least one low grayscale area comprises an over curve type.

6. A method of processing an image of a display apparatus, the method comprising:
   identifying at least one area by analyzing a dynamic range of an input image;
   obtaining at least one mapping function based on dynamic range information and brightness information of the at least one area and dynamic range information of the display apparatus;
   obtaining at least one virtual image where the dynamic range of the input image is converted by using the at least one mapping function;
   synthesizing the at least one virtual image and the input image; and
   outputting the synthesized image,
   wherein the synthesizing comprises synthesizing the at least one virtual image and the input image by applying a first high weight having a weight greater than a predetermined threshold to a high grayscale pixel of a first virtual image obtained using a mapping function corresponding to a high grayscale area and applying a second high weight having a weight greater than the predetermined threshold to a low grayscale pixel of a second virtual image obtained using a mapping function corresponding to a low grayscale area.

7. The method of claim 1, wherein the identifying comprises identifying the at least one area by analyzing at least one of: context information, a histogram, a cumulative distribution function, a color channel correlation, and a noise characteristic of the input image.

8. A display apparatus comprising:
   an image input unit comprising image input circuitry configured to receive an input of an image;
   an image processor configured to identify at least one area by analyzing a dynamic range of the input image, to obtain at least one mapping function based on dynamic range information and brightness information of the at least one area and dynamic range information of the display apparatus, to obtain at least one virtual image where the dynamic range of the input image is converted using the at least one mapping function, and to synthesize the at least one virtual image and the input image; and
   an image output unit comprising image output circuitry configured to output the synthesized image,
   wherein the image processor is further configured to identify at least one high grayscale area having brightness higher than or equal to a value identified by analyzing the dynamic range of the input image.

9. The display apparatus of claim 8, wherein the image processor is configured to identify context information indicating an object displayed in the at least one high grayscale area.

10. The display apparatus of claim 9, wherein the at least mapping function corresponds to at least one high grayscale area,
    wherein the at least one mapping function has different gradients based on a point having an X coordinate value identified based on context information and brightness information of a corresponding high grayscale area and a Y coordinate value identified based on brightness information of a corresponding high grayscale area and dynamic range information of the display apparatus.

11. The display apparatus of claim 9, wherein the image processor is configured to obtain at least one virtual image where the dynamic range of the input image is converted using different color domains based on the context information.

12. The display apparatus of claim 10, wherein the image processor is configured to identify at least one low grayscale area having brightness lower than a value identified by analyzing the dynamic range of the input image,
wherein at least one mapping function corresponding to the at least one high grayscale area is an under curve type, and the at least one mapping function corresponding to the at least one low grayscale area is an over curve type.

13. A display apparatus comprising:
an image input unit comprising image input circuitry configured to receive an input of an image;
an image processor configured to identify at least one area by analyzing a dynamic range of the input image, obtain at least one mapping function based on dynamic range information and brightness information of the at least one area and dynamic range information of the display apparatus, obtain at least one virtual image where the dynamic range of the input image is converted by using the at least one mapping function, and synthesize the at least one virtual image and the input image; and
an image output unit comprising image output circuitry configured to output the synthesized image,
wherein the image processor is further configured to synthesize the at least one virtual image and the input image by applying a first high weight having a weight greater than a predetermined threshold to a high grayscale pixel of a first virtual image obtained using a mapping function corresponding to a high grayscale area and applying second high weight having a weight greater than the predetermined threshold to a low grayscale pixel of a second virtual image obtained using a mapping function corresponding to a low grayscale area.

14. The display apparatus of claim 8, wherein the image processor is configured to identify the at least one area by analyzing at least one of: context information, a histogram, a cumulative distribution function, a color channel correlation, and a noise characteristic of the input image.

* * * * *